United States Patent [19]

Oakes

[11] Patent Number: 5,670,215
[45] Date of Patent: Sep. 23, 1997

[54] COMPOSITION AND METHOD FOR PROTECTIVE COATING

[76] Inventor: Thomas W. Oakes, 10303 Centinella Dr., LaMesa, Calif. 91941

[21] Appl. No.: 731,522

[22] Filed: Oct. 15, 1996

Related U.S. Application Data

[63] Continuation of Ser. No. 650,006, May 16, 1996, abandoned, which is a continuation of Ser. No. 562,755, Nov. 27, 1995, abandoned, which is a continuation of Ser. No. 27,696, Mar. 8, 1993, abandoned.

[51] Int. Cl.$^6$ .............................. C09D 5/16; A01N 31/00
[52] U.S. Cl. .................... 427/385.5; 106/14.41; 106/14.42; 106/14.44; 424/78.09; 427/384; 427/389.8; 428/423.1; 523/122; 523/177
[58] Field of Search ................ 106/14.41, 14.42, 106/14.44; 424/78.09; 427/372.2, 384, 385.5, 389.8; 428/423.1; 514/638; 523/122, 177

[56] References Cited

U.S. PATENT DOCUMENTS

| | | | |
|---|---|---|---|
| 3,736,298 | 5/1973 | Schmit et al. | 528/56 |
| 3,975,350 | 8/1976 | Hudgin et al. | 428/425 |
| 3,989,676 | 11/1976 | Gerkin et al. | 528/81 |
| 4,279,962 | 7/1981 | Meyer et al. | 428/332 |
| 4,329,277 | 5/1982 | Murphy | 523/122 |
| 4,437,892 | 3/1984 | Kelsey | 106/15.05 |
| 4,497,852 | 2/1985 | Lane et al. | 106/18.32 |
| 4,596,724 | 6/1986 | Lane et al. | 427/385.5 |
| 4,654,380 | 3/1987 | Makepeace | 523/122 |
| 4,761,439 | 8/1988 | Braeken et al. | 523/122 |
| 4,820,748 | 4/1989 | Yamamori et al. | 523/122 |
| 4,895,881 | 1/1990 | Bigner | 523/122 |
| 4,898,895 | 2/1990 | Masuoka et al. | 523/122 |
| 4,966,925 | 10/1990 | Castelli et al. | 523/177 |
| 4,996,261 | 2/1991 | Lebovits et al. | 525/131 |
| 5,077,352 | 12/1991 | Elton | 525/409 |
| 5,098,473 | 3/1992 | Hani et al. | 106/18.33 |

FOREIGN PATENT DOCUMENTS

| | | | |
|---|---|---|---|
| 2062614 | 7/1971 | Germany | 106/18.32 |
| 56-133078 | 10/1981 | Japan | 106/14.42 |
| 57-001466 | 1/1982 | Japan | 106/14.41 |
| 2029831 | 3/1980 | United Kingdom | 106/18.32 |
| 2195122 | 3/1988 | United Kingdom . | |
| 2218708 | 11/1989 | United Kingdom . | |

OTHER PUBLICATIONS

FPI Potting and Molding Compounds [No date].
Fluid Polymers, Inc., Engineering Data Sheet, HMP 85-1 [No date].

*Primary Examiner*—Anthony Green
*Attorney, Agent, or Firm*—Jones, Day, Reavis & Pogue

[57] ABSTRACT

A non-ablating, non-toxic coating composition and method for protecting underwater surfaces and surfaces subject to excessive exposure to water and elements is disclosed that is surprisingly easy to clean. The coating composition is prepared from a polyol and an isocyanate and preferably has a VOC content of less than 2 grams per liter. An underwater surface, or other surface subject to excessive exposure to water and elements, is protected by coating said surface with said coating composition to form a smooth, sleek, non-ablating, non-toxic coating on said surface.

11 Claims, No Drawings

COMPOSITION AND METHOD FOR PROTECTIVE COATING

This application is a continuation of application Ser. No. 08/650,006 filed May 16, 1996, now abandoned, which is a continuation of application Ser. No. 08/562,755 filed Nov. 27, 1995, now abandoned, which is a continuation of application Ser. No. 08/027,686, filed Mar. 8, 1993, now abandoned.

BACKGROUND OF THE INVENTION

The problems of fouling by marine life, particularly on sea vessels and underwater structures and surfaces, as well as higher energy costs as the coefficient of friction increases, continue to be a major concern. The fouling of underwater surfaces and structures by marine life causes deterioration of such structures and surfaces. Accordingly, to prevent such deterioration, underwater surfaces and structures are commonly coated with antifouling paints.

Antifouling paints are often laden with toxic biocides or pesticides such as tributyltin, cuprous oxide, zinc oxide, cuprous thiocyanate, or zinc ethylene dithiocarbamate. Examples of such paints and coating compositions are disclosed in U.S. Pat. No. 5,098,473 to Hani et al., which relates to a biocide paint composition comprised of a gel-free dispersion of zinc pyrithione plus cuprous oxide as the active pesticides. These types of coatings are specifically designed to ablate or leech the pesticides to kill sea growth and other accumulated substances. These coatings require scrubbing to maintain a clean surface. However, this periodic cleaning may cause the paint to wear off within 18 months to two years.

Such prior art marine coating materials have both environmental and functional problems. With regard to environmental problems, the current processes involve the release of active pesticide that kill marine life. These self-polishing anti-fouling paints have been used as binders with linear polymers containing pendent side groups referred to as "leaving groups" which are liberated from the polymer by reacting with sea water. The residual polymer is sufficiently dispersable or soluble in sea water to be swept from the paint surface, and a fresh layer of binder is exposed which undergoes a similar reaction with sea water. This release of pesticides has been shown to enter into the food chain and has been strictly regulated both domestically and abroad.

With regard to functional problems, by using an ablating system, the typical life expectancies of the prior art coatings are short, and it is necessary to recoat the surface frequently. Additionally, since these coatings function best only on surfaces which are mobile (such as boats), such coatings are very ineffective for permanent underwater structures (such as offshore platforms). Even on mobile surfaces, there may be areas that are exposed to heavier flow than others, resulting in uneven wear. Furthermore, in low flow areas, the growth of marine life may build to problematic stages.

Other systems that have been devised use materials other than pesticides to resist growth of sea life on underwater structures. For example, silicon, teflon and rosin, as well as cuprous oxide, have been used. The book "Marine Fouling and Its Prevention" published by the United States Naval Institute in 1952 provides a description of many of these coatings. Rosin, it may be noted, contains carboxylic acid functional groups but is not a linear polymer and cannot be used as a binder of a self-polishing paint. In use, it erodes to form a brittle matrix of spent rosin which may be gradually washed from the hull surface by sea water, and increases in roughness over time.

Another problem with the currently used coatings is that the coatings are inflexible. For example, U.S. Pat. No. 3,989,676 to Gerkin et al. discloses a coating that is very hard and has little flexibility and resilience. When an impression is made in this coating, it does not spring back to the original shape.

Embodiments of the present invention overcome these problems and are able to provide both easy cleaning and an environmentally sound coating. Embodiments of the present coating composition, when applied to a surface, form a smooth, low-friction surface that is surprisingly easy to wipe or brush clean without removing or damaging the coating. Embodiments of the present invention do not utilize leaving groups or pesticides to prevent fouling; therefore, the environmental and functional problems experienced with prior art coatings are avoided. Moreover, embodiments of the present coating composition form a flexible surface that retains its original shape for longer periods of time.

SUMMARY OF THE INVENTION

The present invention provides for a coating composition that forms a non-ablating, non-toxic coating for underwater surfaces and structures, and a method for protecting underwater surfaces from corrosion, blistering, and fouling by marine life. According to this method, a coating composition comprised of a polyol and an isocyanate is applied to a surface that is to be used in underwater environments or that is subject to exposure to water and elements. The coating composition preferably contains between about 20% and about 25% isocyanate. The coating composition, which preferably has a VOC content of less than about 2 grams per liter, forms a coating on said surface that is smooth, sleek and soft while remaining non-toxic, non-polluting and non-ablating. After curing, the coating has a Shore A hardness of from about 80 to about 90. Since the coating is non-ablating, it has a much greater life expectancy than coatings formed from coating compositions that are currently available.

This coating composition can be applied in any method similar to a typical paint, and, therefore, no special mechanism is necessary for application. Once applied, this coating composition forms a low friction coating that is very easy to clean. The smooth, soft surface resists attachment by marine life or other such contaminants (including, for example, dirt), and is easily wiped clean of such contaminants.

Furthermore, the coating composition according to the present invention is environmentally safe. The plural components in the present composition completely react, and no solvent is released into the atmosphere when the coating is formed. The composition is created without common antifoulant toxins such as copper, cuprous oxide, tributyltin, organo tin, lead, chromate, or mercury oxide, and, as such, is non-biocidal and non-pesticidal. Since there are no such toxins, there is no release of such toxins into the water that may be captured by sea life and passed into the food chain.

While common anti-fouling paints are designed to ablate or leak out toxins or to be self-cleaning by gradually washing away, this present composition has been specifically designed to be non-ablating and non-leeching. Unlike other protective coatings, the present coating composition is designed to provide a coating that remains on the underwater surface or structure, or other such surface, and does not flake away. By using a non-ablating and non-leeching composition, the coating formed from the present coating composition has a longer life expectancy than other coatings and methods used for protection against deterioration in underwater environments.

DETAILED DESCRIPTION OF THE INVENTION

In accordance with the present invention, a non-ablating coating is formed to protect the surface of underwater structures and sea craft, and other structures subject to excessive exposure to water and elements, from degradation. The present invention includes a coating composition which is suitable, for example, for use as a ship bottom paint and for similar purposes to prevent adherence of debris and water organisms and to prevent fouling of an underwater surface in fresh water or salt water that is surprisingly easy to clean. The coating composition may also be used, for example, on docks (above and below the water line) or even on tanks for carrying or containing liquid materials.

The coating composition according to the present invention is comprised of a combination of two components. Specifically, a polyol component (Part A) and an isocyanate component (Part B) are mixed to form a coating composition.

The Part A polyol component is comprised primarily of a polyol, such as, but not limited to, a polyether polyol. The range of concentration of the polyol is between approximately 45 weight percent and approximately 65 weight percent, expressed as a percentage of the total weight of the coating composition after the Part A and Part B components have been added together. (Hereinafter, all weight percents of the ingredients of the coating composition are expressed as a percentage of the total weight of the composition after combination of the Part A polyol component with the Part B isocyanate component, unless otherwise indicated.) The preferred polyol is ARCO® PPG-725, which is sold by ARCO Chemical. The Part A polyol component may also include a combination of trimethylene glycol di-p-aminobenzoate, talc, iron potassium octoate, and aliphatic oxirane. The preferred ranges of concentration of these materials are indicated in the table below.

|  | RANGE<br>Weight Percent |
| --- | --- |
| Polyol | 45 to 65 |
| Aminobenzoate | 7 to 16 |
| Talc | 0.75 to 4 |
| Octoate | 0.75 to 4 |
| Aliphatic oxirane | 0.75 to 4 |

The Part B isocyanate component is comprised of an isocyanate such as, but not limited to, 4,4 diphenylmethane diisocyanate. The range of concentration of the Part B isocyanate component is between approximately 20 weight percent and approximately 25 weight percent. The isocyanate component may also include a prepolymer and an isomer of the isocyanate. For example, 4,4 diphenylmethane diisocyanate prepolymer may be used, and 4,4 diphenylmethane diisocyanate mixed isomer may also be used. The preferred ranges of concentration of these materials are indicated in the table below:

|  | RANGE<br>Weight Percent |
| --- | --- |
| Isocyanate | 14 to 24 |
| Prepolymer | <6 |
| Mixed isomer | <1 |

The Part A polyol component and Part B isocyanate components are then added together to form a coating composition that may be used to coat an underwater or other such surface. The ratio by weight of the Part A polyol component to the Part B isocyanate component is preferably between approximately 3.25:1 and approximately 3.9:1. It may be noted that the plural components in the present system are 100% reactive. Upon mixing of the components, virtually no solvents are released into the atmosphere and nearly all of the coating composition becomes coating when applied. Polymerization is accomplished without an organic solvent such as xylene, toluene, butyl acetate, butanol, hexanone, or methyl ethyl ketone, alcohol or water. Polymerization is preferably carried out at an ambient temperature in the range of 50° F. to 90° F. in relatively low humidity and dry working conditions.

As noted previously, the coating composition and coating formed therefrom are non-biocidal, non-pesticidal and non-toxic in that they include no copper, cuprous oxide, tributyltin, organo tin, lead, chromate, mercury oxide or other such common antifoulant toxins. Likewise, the coating composition includes no silicon organic compounds or other fluorocarbon polymers. In contrast, other antifoulant coating compositions commonly include as much as 72 percent, by weight, individual toxins or combinations thereof to impart antifouling properties through killing of sea life. As such toxins are emitted into surrounding waters by ablation, they may be captured by the sea life and pass from one form of sea life to another. Ultimately, these toxins may pass through the food chain to humans who eat the contaminated sea life.

It may also be noted the coating composition according to the present invention is nonpolluting in that it does not use solvents to dissolve the active ingredients. It is often desirable to avoid such solvents because they can be emitted into the atmosphere upon application. The potentially destructive effect that solvents such as methyl ethyl ketone can have on the ozone layer has been reported in the literature.

The use of a non-ablating and non-leaching coating according to the present method avoids problems that may arise from ablation. As noted previously, traditional antifouling paints are designed to ablate or leach out toxins or be self-cleaning by gradually washing away. For example, current antifouling paints that are in widespread commercial use on sailboats and larger vessels are often designed to ablate. An ablating system, however, requires that the underwater surface (such as the hull of a ship) be scrubbed monthly with coarse cleaning pads, and requires, after a period of about eighteen months to two years, that such surface be hauled out of the water for cleaning and repainting.

Due to the size of some ships, performing this type of dry-dock cleaning every two years would be impractical. Therefore, the United States and other governments have granted exceptions (with respect to environmental regulations) for the types of antifouling coatings that may be used for certain crafts. For example, some super large crafts use highly toxic tributyltin and are designed to be fully ablated in five years. With the present coating, the dry dock cleaning problem appears to be overcome, and, thus, the exceptions for the super large crafts (and other crafts) will be less necessary. This will likely reduce the amount of highly toxic tributylin that currently pollutes the sea.

The easy cleaning feature of the present invention is due to the chemical design in the polymerization of the plural components. After application of the coating composition to a surface to be used in an underwater environment, the exterior surface of the coating cures to a very smooth, soft surface with low friction. With such a surface, sea life has difficulty attaching. Furthermore, marine life and growth on the surface may be removed through easier and less stringent cleaning than is presently used for common antifouling paints. In some waters, monthly cleaning regimens may be desirable for the present invention. Cleaning may be performed with any suitable materials, such as scrub pads.

Compositions according to the present invention may be applied on a variety of substrates including fiberglass, steel, aluminum, wood, concrete, glass, stainless steel and brass. Substrate preparation includes blasting and cleaning, and application of industry-standard pretreatments, such as primers appropriate for each substrate. The present coating composition may be applied over other coatings, such as epoxy, urethane, polyvinyl and acrylic, with pretreatment with an appropriate primer.

When used on fiberglass substrates (with or without a primer or other such pretreatment), the coating composition of the present invention provides a coating that prevents the type of blistering in the fiberglass, particularly osmotic blistering, that is common with ordinary coatings on fiberglass substrates. With ordinary coatings on fiberglass substrates, blistering of the fiberglass occurs over time. In the present method, however, the coating formed on a fiberglass substrate has been found to resist blistering. Accordingly, the present invention provides a unique method to prevent blistering in fiberglass surfaces used in underwater and other such environments.

The present method also resists corrosion and electrolysis of metal substrate surfaces. Such corrosion can occur, for example, by oxidation of a metal surface, as when steel rusts. In addition, electrolytes in water can also corrode metal surfaces, such as aluminum. Such corrosion and electrolysis of metal surfaces used under water are resisted by coating such surfaces with the coating composition of the present invention.

The coating may be applied in different ways, for example with a roller, spraying, brush or flow coating. A unique application system has been developed for use with this plural component material. The separate materials are stored where they can be drawn off in correct proportions and pumped through a static mixing head and into a rolling tray. Alternative designs for the application equipment include pumping the proportioned and mixed material directly onto the roller at the substrate site.

Pigments for color may be used in the coating composition, and the natural color thereof (without pigment) is a clear-appearing material when the coating is cured. Where the user wishes to have certain colors, coloring may be applied first to the substrate or on the prime coat. The present coating composition may then be applied to the surface. As noted above, the coating offers excellent electrical properties and protection against corrosion, and no fillers for rust and corrosion protection need be used. Should color pigments with base or otherwise toxic metals be used as colorant, there will be no threat of toxicity to the surrounding waters. This is because the polymerization process completely surrounds and protects all the additives, and there is no ablation to allow such additives to leach and pollute the waters.

The thickness of the applied coating may vary. A minimum coating thickness of 5 microns may be used, but, usually, 25 to 30 microns of coating consisting of three rolled layers (or a coating of 25 to 30 microns that is sprayed on) will provide more satisfactory service. This coating thickness will protect the coating from wearing; bumping from debris in the water; thinning of the surface because of metallic consumption due to electrical build-up; and bubbling, blistering and cracking due to moisture.

The present invention will hereunder be described in even greater detail by reference to the following Examples which are given here for illustrative purposes only and are by no means intended to limit the scope of the present invention.

EXAMPLE 1

A coating composition was prepared by mixing together a Part A component and separately preparing a Part B component. The Part A component was comprised of the following materials (amounts given in parts by weight):

| | |
|---|---|
| 77 parts | polyether polyol (ARCOL® PPG-725 obtained from ARCO Chemical) |
| 15 parts | trimethylene glycol-di-p-aminobenzoate |
| 2.5 parts | aliphatic oxirane |
| 2.5 parts | talc |
| 2.5 parts | iron potassium octoate |
| 100 parts | Part A polyol compound |

The Part B component was prepared by obtaining an isocyanate from a commercial vendor. The isocyanate used in this Example was a carbodiimide-modified methane diisocyanate ("MDI") from BASF Corp. called LUPRANATE™ MM103. This isocyanate was comprised of 75% 4.4' diphenylmethane diisocyanate, less than 25% MDI prepolymer, and less than 5% MDI mixed isomers.

A coating composition was prepared by mixing 100 parts (by weight) Part A with 28 parts (by weight) Part B. Thus, the final coating composition was comprised of 60% polyether polyol; 12% trimethylene glycol-di-p-aminobenzoate; 2% aliphatic oxirane; 2% talc; 2% iron potassium octoate; and 22% isocyanate compound. The coating composition, after mixing, was immediately applied with a roller to two bare aluminum test panels, in an amount of approximately ⅛ pounds per square foot. The coating, after curing, had a Shore A hardness from about 80 to about 90.

The coated test panels were then submerged completely in the ocean and thereby exposed to ocean conditions for a period of five (5) years, with periodic examination and cleaning during that time period. For comparative purposes, a bare aluminum panel and a bare steel panel were also submerged in the same location, and were also examined and cleaned periodically.

The two coated test panels, coated with the coating composition described above, were easy to clean, and dirt and marine life were easily wiped off with either a metal spatula or the end of a piece of wood. After five (5) years, the coating remained strong and had not peeled or worn through, and had not ablated or leeched away. The coating, after five years, continued to resist corrosion by oxidation and electrolytes.

For the bare aluminum panel, sea life, especially tube worms and plant growth, became quickly attached and could be scraped off only with heavy pressure using a metal spatula, and even then, the surface could not be completely cleaned. There was growth everywhere on the panel, and no bare metal could be seen when the panels were pulled out for inspection. Growth of either plant or tube worms had covered the entire surface.

For the bare steel panel, the steel became so heavily rusted that within three months it could not be cleaned, even using a wire brush. Over several months the steel began to rust away.

EXAMPLE 2

This was a Comparative Example in which two coated aluminum panels prepared as described in Example 1 were tested against aluminum panels coated with a polyester powder-based coating. The panels with the polyester powder-based coating were prepared by (i) obtaining a polyester powder-based coating (from H. B. Fuller Corp., Santa Fe Springs, Calif.), (ii) curing said powder-based coating with heat, and (iii) applying said coating to aluminum test panels in an amount of approximately ⅛ pounds per square foot.

The panels prepared according to Example 1 were easy to clean and resisted adhesion by marine life. Growth could be wiped off with one stroke of a metal spatula or a plain piece of wood. Carpet or nylon bristle brush also worked to clean these panels. When the panels were brought up for cleaning and inspection it was often possible to see most of the coated surface between the limited amount of growth thereon— thus, the coating was not only easy to clean, but also resisted growth or attachment of marine life to the surface of the panels in the first instance.

The panels treated with the polyester powder-based coating attracted much growth and were difficult to clean. The surfaces of the test panels were not as smooth and soft as the test panels coated according to Example 1, and greater effort was required to clean the test panels with the polyester powder-based coating. Upon visual inspection, it was possible to see some of the coating between the growth accumulated from one cleaning cycle to the next, but to a much lesser extent than with the panels coated according to Example 1. The powder-based coating, it may be noted, was tested because it was known to have resistance to salt penetration.

EXAMPLE 3

This was a Comparative Example in which test panels were treated with an epoxy coating (H. B. Fuller Corp., Santa Fe Springs, Calif., Epoxy 254, powder-based and cured with heat). These panels revealed no difference in cleanability as compared to the polyester powder coated samples described in Example 2.

In addition, other panels were treated with a "Compound X" manufactured by StarBrite, Ft. Lauderdale, Fla., and described as containing an antifouling additive of oxytetracycline hydrochloride. These panels performed in a manner similar to the polyester powder-based coating samples, and required a similar effort to clean. Moreover, after some months of cleaning, the "Compound X" coating had worn away completely.

EXAMPLE 4

A coating composition prepared as described in Example 1 was applied to a white sandblasted aluminum boat hull after cleaning with an acid etch wipe and priming with a two part primer. Three coats were rolled on, one after the other within 30 minutes of each other. Each coat was approximately five (5) microns thick, and, thus, the final coating thickness after all coats were applied was approximately fifteen (15) microns. Part A and Part B were mixed in 100-gram batches, and mixing was carried out by motorized stirring for about 1 minute. On an experimental basis, for testing purposes, four (4) identical 24' Navy patrol boats were coated with this innovative coating and launched, two each in San Diego and Long Beach, Calif. harbor waters, for a period exceeding 4 years.

No cleaning was done on these craft for the first 10 months, and the craft were cleaned as needed intermittently after that time. These cleanings were performed primarily at one month intervals during the summer and longer intervals during the winter. Cleaning methods included wiping with carpet pads attached to a board or scraping with a plastic spatula. Adhesion of the coating to the hull was excellent, with only a few minor scratches from floating debris having occurred on the hull of one craft. The coating remained soft and the exterior surface smooth, yielding a low growth attachment between cleanings.

There was a surprisingly marked reduction in consumption of zinc anodes on these craft compared to zinc consumption on similar craft without this unique coating. Because electrical buildup normally reduces the bulk of the zinc from the hull, the coating prevented the consumption of zinc by forming an electrical insulator.

Due to the unique tight-knit polymer chemical crosslinking of the present plural component material, the coating formed a moisture barrier with extremely low moisture attack. Traditionally, antifouling paints have allowed moisture to pass osmotically into the fiberglass (in the case of fiberglass surfaces) to cause bubbling, blistering and cracking.

Prior to applying this present coating in this Example, one of the boats, having a new aluminum hull, was measured at 24 miles per hour at top speed with 3800 RPM. After coating, the same craft was measured at 27 miles per hour, a 14% increase in speed, at the same RPM. Thus, it appears that the coating reduced friction and increased the craft's speed with the same engine and fuel consumption. Navy personnel who operated the craft also reported a reduction in noise on the interior of the craft after coating, compared to the noise level with the bare aluminum hull.

The original coating thickness on the hull was observed to have remained essentially the same during the four years after application. This was due to the design of non-ablation or non-leaching of the coating. Thus, no pesticides or biocides were ablated into the surrounding waters, reducing toxic pollution in the subject harbor waters.

EXAMPLE 5

This Example is intended to demonstrate the performance of an aluminum boat hull surface having a coating according to Example 1 versus an untreated aluminum boat hull surface. The two boats used in Example 4 were used for this comparison.

Hull cleaning time for the coating was significantly reduced compared to requirements for bare aluminum hull cleaning. The two craft were cleaned for the first time ten (10) months after launching and then again after another 6 months use. Other similar craft with bare aluminum hulls required monthly cleaning because of extensive growth. This cleaning effort is described in the following table:

| Cleaning Time Per Craft for Boats With Example 1 Coating | Cleaning Time Per Craft for Boats with Bare Aluminum Hull |
| --- | --- |
| 2 separate cleanings in × 20 man hours 2 people × 5 hrs × 2 days = 20 40 man hours | 15 separate cleanings in × 24 man hours for each cleaning 2 people × 6 hrs × 2 days = 24. Chemicals were also used in cleaning these craft. 360 man hours |

Thus, the boats coated as described in Example 1 required 320 less man hours for cleaning.

EXAMPLE 6

A two-part coating composition was prepared as in Example 1, except that UV absorbers of the hydroxyphenyl benotriazole class were added to Part A in an amount of 0.5% by weight of the final weight of the coating composition (i.e., after Part A and Part B were added together). The coating composition was applied at a temperature of approximately 75° F. The coating composition was applied to aluminum test panels, and was found to exhibit the same highly-acceptable performance in tests as did the coating of Example 1.

EXAMPLE 7

A coating composition was prepared as in Example 1, except instead of an MDI, a Part B isocyanate component of toluene diisocynate (comprised of toluene diisocyanate (TDI) 70–95% by total weight of Part B, prepolymer thereof less than 25% by weight, and mixed isomer thereof less than 5% by weight) was used for Part B. The coating composition was applied to aluminum test panels, and was found to exhibit the same highly-acceptable performance in tests as did the coating of Example 1. However, it is noted that MDI is preferred over TDI because of the toxic nature of TDI.

EXAMPLE 8

The subject coating constructed using diarylmethane diisocyanate (MDI) aromatic has been found to be an effective low cleaning/fouling release hull coating. There was no ablation of the coating nor any toxins being ablated because there was no ablation or toxins in the coating. Additionally, there are virtually no volatile (VOC's) in the present coating. A comparison was made with an antifouling coating by Kelsey which uses an ablation mechanism. The Kelsey material uses Xylene, which is distinct from the present coating system. In the Kelsey coating, ablation occurs where Tributyltin oxide is used to ablate as a biocide. The Kelsey coating employs a trimerised hexamethylene diisocyanate (Desmodor N), which would not function in the innovative coating composition.

EXAMPLE 9

Further experiment was initiated by coating a 50' Navy craft with a coating composition prepared as described in Example 1. The application procedure, however, was enhanced to include a PRO/MIX System to proportion and mix the plural component coating. The application system included storage for each material part, separate pumps on a single lever system that correctly proportioned the materials and forced them through a static mixer to properly mix the separate materials and put them in a tray ready for application. The equipment produced properly proportioned and mixed material for the subject craft hull as evidenced by physical and visual inspection. It was found that polymerization was complete and that the coating on the entire hull under the water line was fully cross linked and cured.

EXAMPLE 10

In this Example, coated test panels prepared as described in Example 1 were tested in fresh water. For this test, the panels were placed in Lake Erie, where zebra mussel attachment is an extensive problem. The two panels were placed in the water at a dock at Port Clinton, Ohio in May and were removed, after the pest growing season, in December of the same year. The two panels were both reported to be completely free of growth or any zebra mussel attachment.

EXAMPLE 11

The purpose of this example was to demonstrate that this innovative coating has the additional goal of reducing air pollution at the source. Current antifouling paints frequently contain as much or more than 40% solvent (VOC's) that escape into the atmosphere. CALCOST ANALYTICAL-ITL Laboratory carried out VOC content experiments on a coating composition as described in Example 1 and reported that the VOC content was 1.5 grams/liter, or 0.0125 pounds/gallon, as compared to a competing antifouling paint 1088C by Pro-line Paint Co. with 40% solids and 60% solvents and having a VOC content of approximately 140 grams/liter.

The South Coast Air Quality Management District (SCAQMD) of Los Angeles, Calif. analyzed a coating composition prepared according to Example 1 and reported the following: "The coating complies with VOC requirements of Rule 1106 and Rule 1106.1" and "the coating does not contain any materials identified as a carcinogenic air contaminant in Rule 1401."

The coating composition received "The Pollution Prevention Achievement Award" Mar. 15, 1992 from US EPA-Region IX for the coating project's outstanding contribution to environmental protection through pollution prevention.

EXAMPLE 12

The purpose of this experiment was to demonstrate that the present coating performs on a stationary surface. In this test, some seventeen panels with six different coating materials thought to survive well in ocean water were coated and placed in constant ocean water exposure in the San Diego bay. The panels were inspected over a five-year period. The coating of the present invention (on an aluminum panel) clearly offered the best longevity, low cleaning and low growth features of any of the others in the sample set. Monthly inspections indicated far less growth on the subject composition and this growth was easily brushed off with a wood or metal spatula. Other surfaces had significant attachment of growth, and scraping such growth off required greater physical effort. A control panel of bare aluminum was used in the test set, and it too had significant growth at each cleaning that required great physical effort to scrape clean. Other coating types included systems that were hard, enamel-like, hard polymer and thin hard polymers. One was a commercial antifoulant coating with biocide named Compound X. The latter coating soon became overgrown with sea life and required hard scraping. As time went by this latter biocide coating was no better than the other types of coating. The coating of the present invention, however, remained soft and easy to clean up to the present time.

In summary, an advantageous method for preventing fouling of underwater and other such surfaces has been discovered. In this method, a polyol and an isocyanate composition are applied to an underwater or other surface to create a coating that is a smooth, soft, non-biocidal and non-peticidal. The coating composition has a VOC content of less than 2 grams per liter, as determined by ASTM standard test D 3960. The coating is prepared so that it has a Shore A hardness from about 80 to about 90. The coating is capable of preventing the fouling of the surfaces of submerged materials without apparently causing any environmental harm. The present invention has the further versatility of being non-ablating and retaining its protective features for longer periods of time. It can be utilized by both mobile and non-mobile structures, and protects against corrosion by oxidation or electrolysis, and against blistering of fiberglass surfaces.

While preferred embodiments and their advantages have been detailed in the above description, the invention is not limited thereto but only by the spirit and scope of the appended claims.

I claim:

1. A method of preventing fouling and corrosion by oxidation or electrolysis of a surface to be used in water, said method comprising the steps of:
   (a) coating said surface with a non-pesticidal and non-biocidal coating composition comprised of (i) a polyol present in an amount of at least 45% by weight percent of the coating composition, and (ii) an isocyanate present in an amount of at least 20% by weight percent of the coating composition; and
   (b) allowing said composition to cure; wherein said coating composition, after curing, is non-ablating and has a Shore A hardness of from about 80 to about 90.

2. The method of claim 1, wherein said coating composition, prior to application to said surface, has a VOC content of less than 2 grams per liter as determined by ASTM Standard Test D 3960.

3. The method of claim 1, wherein said polyol is a polyether polyol.

4. The method of claim 1, wherein said polyol comprises, by weight percent, from about 45% to about 65% of the coating composition.

5. The method of claim 4, wherein said isocyanate comprises, by weight percent, from about 20% to about 25% of the coating composition, and wherein the balance of said coating composition is comprised of a filler, iron potassium octoate, an aminobenzoate or an aliphatic oxirane.

6. The method of claim 5, wherein said isocyanate is a mixture of (i) 4,4 diphenylmethane, (ii) a prepolymer of 4,4 diphenylmethane diisocyanate, and (iii) a mixed isomer of 4,4 diphenyl methane diisocyanate.

7. A method of preventing blistering in a fibreglass surface to be used in water, said method comprising the steps of:
   (a) coating said surface with a non-pesticidal and non-biocidal coating composition comprised of (i) a polyol present in an amount of at least 45% by weight percent of the coating composition, and (ii) an isocyanate present in an amount of at least 20% by weight percent of the coating composition; and
   (b) allowing said coating composition to cure; wherein said coating composition, after curing, is non-ablating and has a Shore A hardness of from about 80 to about 90.

8. An underwater surface having a non-ablating, non-pesticidal and non-biocidal coating comprised, by weight percent, of:
   (a) a polyether polyol in an amount of at least 45% of the coating; and
   (b) an isocyanate in an amount of at least 20% of the coating;
wherein said coating has a Shore A hardness from about 80 to about 90.

9. The underwater surface of claim 8, wherein said surface is the hull of a boat.

10. The underwater surface of claim 8, wherein said polyol comprises, by weight percent, from about 45% to about 65% of the coating; and wherein said isocyanate comprises, by weight percent, from about 20% to about 25% of the coating; and wherein the balance of said coating is comprised of a filler, iron potassium octoate, an aminobenzoate or an aliphatic oxirane.

11. A method of preventing fouling and corrosion by oxidation or electrolysis of a surface to be used in water, said method comprising the steps of:
   (a) coating said surface with a non-pesticidal and non-biocidal coating composition comprised of (i) a polyether polyol in an amount, by weight percent, of at least 45% of the coating composition and (ii) an isocyanate in an amount, by weight percent, of at least 20% of the coating composition; and
   (b) allowing said coating composition to cure;
wherein the balance of said coating composition is comprised of a filler, iron potassium octoate, an aminobenzoate or an aliphatic oxirane, and wherein said coating composition, after curing, is non-ablating and has a Shore A hardness of from about 80 to about 90.

* * * * *